US008496030B2

(12) United States Patent
Baltes

(10) Patent No.: US 8,496,030 B2
(45) Date of Patent: Jul. 30, 2013

(54) HYDRAULIC ACCUMULATOR, ESPECIALLY PULSATION DAMPER

(75) Inventor: Herbert Baltes, Losheim (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 13/261,279

(22) PCT Filed: Nov. 9, 2010

(86) PCT No.: PCT/EP2010/006813
§ 371 (c)(1), (2), (4) Date: Apr. 27, 2012

(87) PCT Pub. No.: WO2011/079890
PCT Pub. Date: Jul. 7, 2011

(65) Prior Publication Data

US 2012/0211110 A1 Aug. 23, 2012

(30) Foreign Application Priority Data

Dec. 30, 2009 (DE) ........................ 10 2009 060 852

(51) Int. Cl.
*F16L 55/04* (2006.01)

(52) U.S. Cl.
USPC ............................................... 138/31; 138/30

(58) Field of Classification Search
USPC ..................................................... 138/30, 31
See application file for complete search history.

(56) References Cited

U.S. PATENT DOCUMENTS

| | | | | |
|---|---|---|---|---|
| 6,286,552 | B1 * | 9/2001 | Shimbori et al. | 138/31 |
| 6,810,915 | B2 * | 11/2004 | Umetsu et al. | 138/31 |
| 7,325,571 | B2 * | 2/2008 | Shimbori et al. | 138/30 |
| 8,365,772 | B2 * | 2/2013 | Arikawa et al. | 138/30 |
| 2006/0037658 | A1 * | 2/2006 | Shimbori et al. | 138/30 |
| 2007/0102052 | A1 * | 5/2007 | Yoshihara et al. | 138/30 |
| 2010/0108168 | A1 * | 5/2010 | Ota et al. | 138/30 |
| 2012/0211111 | A1 * | 8/2012 | Baltes | 138/30 |

FOREIGN PATENT DOCUMENTS

| | | |
|---|---|---|
| DE | 10205814 | 8/2003 |
| DE | 10238199 | 3/2004 |
| DE | 102007034315 | 7/2009 |
| JP | 2002 070801 | 3/2002 |
| JP | 2004 232784 | 8/2004 |

* cited by examiner

*Primary Examiner* — Patrick F Brinson
(74) *Attorney, Agent, or Firm* — Roylance, Abrams, Berdo and Goodman LP

(57) ABSTRACT

A hydraulic accumulator, especially a pulsation damper, comprises a metal bellows (19) that has a terminal element (35) which can be displaced along the wall of a housing (1) at least on one bellows end (31) during expansion and compression of the bellows (19), a guiding means (47) being interposed between the terminal element and the housing. Said guiding means comprises, on at least one peripheral zone of the terminal element (35), on its outer periphery, first annular sections (51) that are radially spaced apart from the wall of the housing (1) and that are separated from each other by second annular sections (53) and radially project over the first annular sections (51).

5 Claims, 3 Drawing Sheets

HYDRAULIC ACCUMULATOR, ESPECIALLY PULSATION DAMPER

The invention relates to a hydraulic accumulator, especially a pulsation damper, comprising a metal bellows which on at least one bellows end has an end body, said end body being movable along the wall of the housing during expansion and compression of the bellows, between the end body and the housing there being a guide means, which on at least one peripheral region of the end body on its outer periphery forms first annular sections which have a radial distance from the wall of the housing and which are separated from one another by second annular sections which project radially beyond the first annular sections and which are distributed on the outer periphery, the end body being axially lengthened by a peripheral sleeve part which extends in the direction to the immovable bellows end, and the end of the sleeve part adjoining a housing-mounted part as a stop body when the bellows is compressed.

DE 102 05 814 A1 proposes such a hydraulic accumulator in the form of a hydraulic fluid accumulator, comprising a housing in which an interior space is formed which is divided by means of a medium separation element into a gas space and a fluid space which is provided with a fluid port. The medium separation element is a thin-walled bellows which is formed from spring steel and which is provided with a guide. The guide is made as a valve for blocking a first region of the fluid space which surrounds the bellows relative to a second region of the fluid space which is connected to the bellows on the end side. The guide can be made as a ring which encompasses at least one channel which is located preferably on the periphery and which leads from a first end side of the ring to a second end side of the ring. The ring is guided to slide axially in the bore with a narrow play and has a cup-like insert to whose bottom the end body of the bellows is attached. The ring itself can be made cup-shaped and can have a bottom; this ensures higher tightness.

DE 10 2007 034 315 A1 relates to an accumulator for a closed hydraulic circuit of a motor vehicle steering system with a hydraulic pressure chamber which is connected to the hydraulic circuit and which has at least one movable pressure space wall, as well as a pretensioned spring element which acts on the movable pressure space wall and thus establishes a preloading in the hydraulic circuit, the pressure space being separated in sections by a bellows. A bottom part of stable shape which is connected to the bellows can be made cup-shaped, and its peripheral wall in the radial direction can form a support for the bellows. The peripheral wall of the cup-shaped bottom part surrounds the bellows and the spring element, which is designed as a helical spring, on the outside surrounds the peripheral wall of the bottom part.

Metal bellows are used in various technical fields as a component of variable length, for example, when equalization of lengths in lines or coupling connections for flowable media is necessary. In particular, metal bellows are also often used in hydraulic accumulators as a movable separating element between the gas side and fluid side. Especially in applications where relatively extensive movements take place during expansion and compression of the bellows, or if back and forth movements take place at a relatively high rate and/or at higher acceleration values, as is the case in pulsation dampers or shock absorbers, it is not only essential for the service life of the bellows that the respective bellows end which is moving along a housing wall in operation is guided in a safe and reliable manner, but it must also be ensured that a compression of the folds does not occur when the bellows is compressed.

In this respect, the prior art provides a guide means on the movable end of the bellows involved. In a prior art solution published at a later date, disclosed in German patent application DE 10 2007 036 487.5, the guide arrangement is designed in such a way that individual guide bodies that are distributed around the periphery of the end body are fastened to the peripheral edge of the movable end body of the bellows; and these guide bodies form sliding bodies that are guided so as to rest with an outer sliding surface against the wall of the housing. The sliding surfaces of these bodies are spaced radially apart from the peripheral edge of the end body, so that fluid passages are formed along the housing wall between the individual guide bodies.

These guide bodies are designed as guide shoes; and, when the end body is configured in the form of a cup, the guide shoes overlap the peripheral edge of the cup, which has a circular cylindrical side wall that extends into the interior of the bellows. When the guide bodies are made of a plastic material with good sliding properties, good guide properties are attained; that is, when the friction ratio between the guide body and the housing wall is favorable, the guide provides safe and reliable long term operation. On the other hand, the production is complex and cost intensive. The individual guide bodies, which are fabricated in a separate production step, have to be brought to the assembly site and mounted on the end edge of the end body of the pertinent bellows. In order to ensure a reliable anchoring of the guide bodies, the guide bodies are designed as guide shoes, having a profile that is similar to the shape of a U in the cross section, with legs that overlap the end edge of the cup-like end body. In this context, the end edge of the cup has to have a catch, and the interior of the profile of the guide shoes has to have at least one undercut in order to make it possible to secure the guide bodies with a snap lock action. The formation of the undercuts involves a time-consuming and costly production of the guide shoes by compression molding.

The object of the invention is to provide a hydraulic accumulator in which increased operational reliability is ensured by especially careful stressing of the bellows while maintaining the good guiding properties of the aforementioned solution.

This object is achieved according to the invention by a hydraulic accumulator having the features specified in claim 1 in its entirety.

According to the characterizing part of claim 1, an important particularity of the invention consists in that the bellows on its end opposite the movable end body is fixed on a housing-mounted retaining ring which the end of the sleeve part strikes, and that the guide means has an annular body which with one annular part which forms the first ring surface parts engages on the end body a peripheral annular groove which is located axially offset on the end body away from the immovable bellows end in the direction which increases the distance to the retaining ring. In this way, the sleeve-like extension of the end body forms not only an outer guide for the compressed bellows, but at the same time forms a positive and therefore reliable stroke limiter when the bellows is compressed. The guide length which is increased in this way ensures an especially tilt-resistant guidance.

In an especially advantageous manner, the arrangement can be made such that the sleeve part extends over a distance which exceeds the axial length of the compressed bellows. In this way, the stroke limiter takes effect before the bellows is compressed to such an extent that a compression of the folds could occur.

A further improvement of the guide properties arises when the sleeve part exhibits a second annular groove for the annular part of another annular body in the position which is axially offset toward the first annular groove, and the end body is thus guided in a completely tilt-resistant manner.

An optimum operating behavior, promoted by correspondingly small friction forces, can be attained with annular bodies which are formed from a plastic material with good sliding properties.

Especially advantageously, the arrangement can be made such that on the respective annular body the second annular sections are axially taken up by surfaces which are shoulderless continuations of the radial planes of the annular part which is to be accommodated in the pertinent annular groove. The production of such an annular body in the manner of a plane flat ring is especially simple and economical.

The invention is detailed below using one exemplary embodiment which is shown in the drawings.

Figure 1:
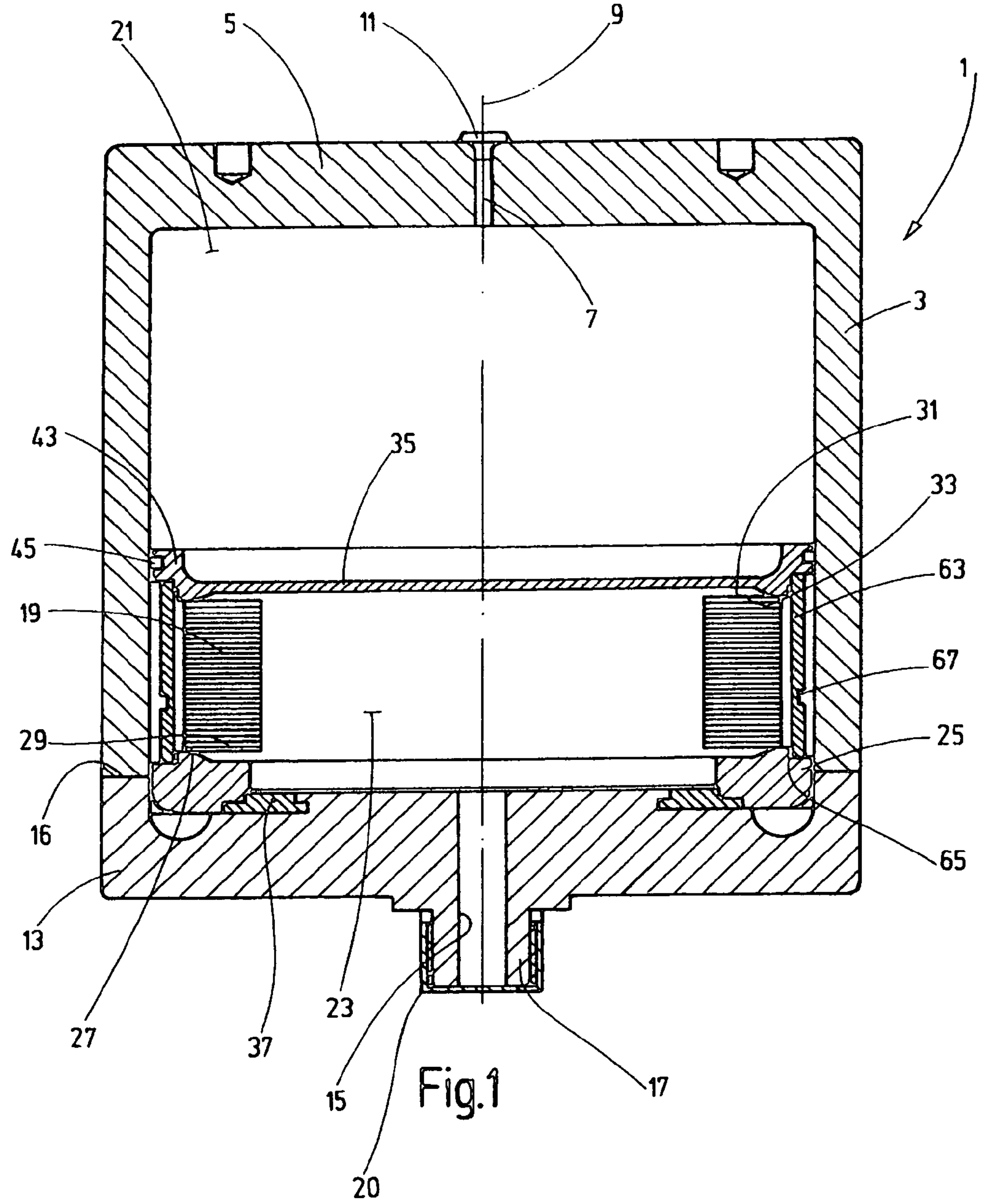
FIG. 1 shows a schematically simplified longitudinal section of a hydraulic accumulator which is intended for use as a pulsation damper with a metal bellows which is used as a movable separating element between the gas side and fluid side, provided with a guiding device.

FIG. 1 shows a hydraulic accumulator in the form of a pulsation damper. An accumulator housing designated as a whole as 1 has a main housing part 3 in the form of a circular cylindrical cup with an end 5 which is at the top in the drawings and which is closed except for a fill opening 7 which is flush with the longitudinal axis 9 of the housing and in FIG. 1 is closed fluid-tight by a weld nugget 11. On the opposite end, which is located at the bottom in FIG. 1, the housing 1 is closed by a closure part 13, which is tightly welded to the main housing part 3 along a welding line 16. A fluid inlet 15 with an outer connecting pipe 17 is arranged concentrically to the axis 9 in the closure part 13. In the drawing from FIG. 1, a threaded protective cap 20 is screwed onto the outer thread of the connecting pipe 17.

Within the accumulator housing, a metal bellows unit forms a movable separating element between a gas side 21, which borders the housing end 5 and which can be filled via a fill opening 7 with a working gas, preferably $N_2$, at a gas prefill pressure. In the drawing from FIG. 1, the bellows 19 is in its fully compressed state, with the volume of the gas side 21 having the maximum value, whereas the fluid side 23, adjacent to the fluid inlet 15, exhibits its minimum volume. The bellows unit is welded in a fluid-tight manner to a metal retaining ring 25 with the bellows end 29 adjacent to the housing closure part 13—stated more precisely, on the radially outside edge of the last bellows fold. The retaining ring 25 in turn is welded to the accumulator housing at the point of separation between the closure part 13 and the main part 3 on the welding line 16. When the accumulator housing is assembled and integrated into the bellows unit, the welding line 16 therefore is thermally insulated at least to some extent from the bellows end 29 by the retaining ring 25. The weld area of the bellows end 29 at the retaining ring 25 is at a site designated as 27 in the figure, where the retaining ring 25 forms an axial bulge as the weld area.

The movable bellows end 31 opposite the housing-mounted bellows end 29 is welded on the radially outer end edge of the last bellows fold at 33 to a metallic end body 35, which forms a closure body which seals the interior of the bellows 19 fluid-tight and thus forms the separation between the gas side 21 and the fluid side 23. The outside of the bellows 19 is sealed by a sealing arrangement 37 in the form of an annular seal element which seals the retaining ring 25 relative to the housing closure part 13. The end body 35 in the illustrated exemplary embodiment has the shape of a disk which is planar, aside from its peripheral edge 43.

Figure 3:
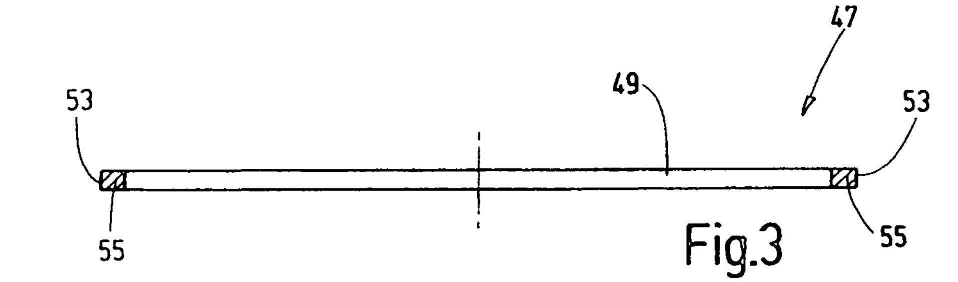
FIG. 3 shows a section according to cutting line III-III from FIG. 2.
Figure 2:
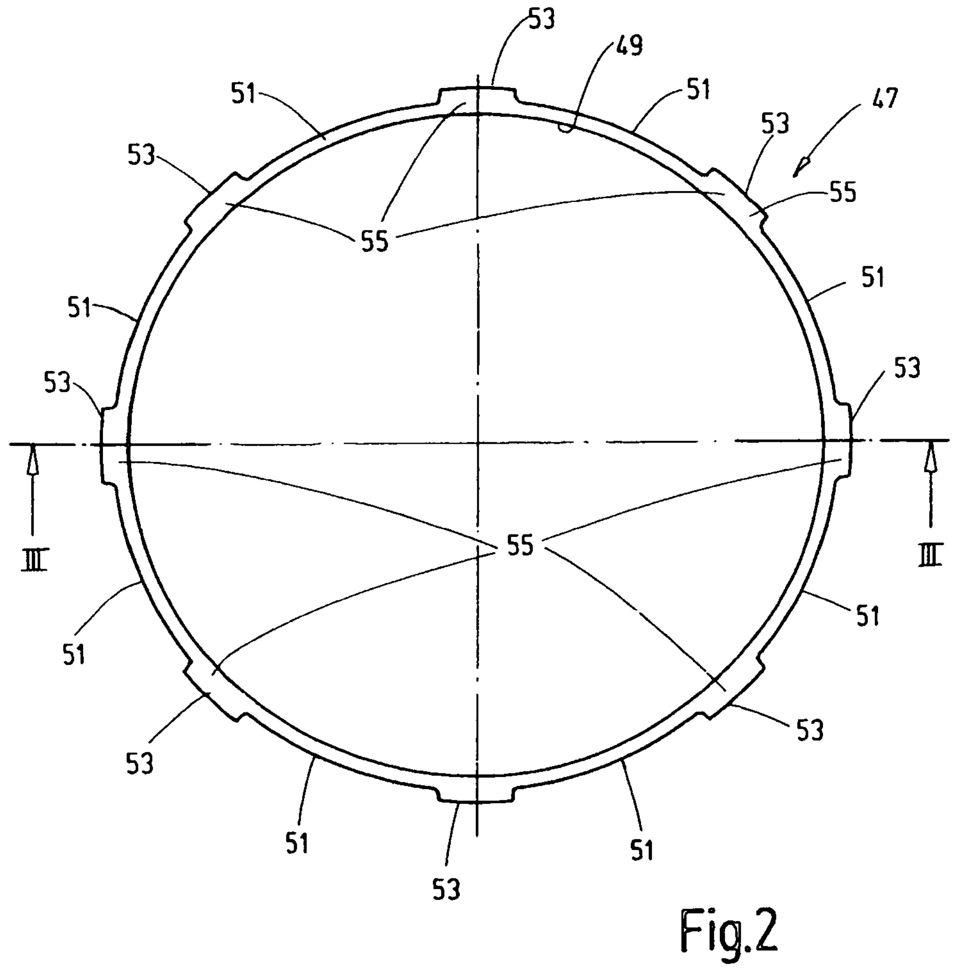
FIG. 2 shows a plan view of an annular body which is shown approximately in actual size of a practical embodiment and which forms a component of the guiding device of the exemplary embodiment from FIG. 1.

The peripheral edge 43 of the end body 35 extends beyond the adjacent bellows end 31 radially to the outside toward the weld site 33 of the bellows end 31 and runs from there away from the bellows end 31 radially and axially approaching the housing wall. In the peripheral edge 43, there is a peripheral annular groove 45 which forms the seat for an annular body 47, see FIGS. 2 and 3, as a component of a guiding device. The annular body 47 is a flat ring of a plastic with good sliding properties, especially of tetrafluoroethylene. As is shown especially by FIGS. 2 and 3, the annular body 47 has an annular part 49 which sits in the annular groove 45 and which forms on its outer periphery first annular sections 51 which are separated from one another by second annular sections 53. The second annular sections 53 are radially offset to the outside relative to the annular sections 51, see FIG. 2, such that the second annular sections 53 form sliding surfaces which adjoin the housing wall on guide bodies 55 which project radially from the inner annular part 49. In operation, if the fluid side 23 and thus the interior of the bellows 19 are pressurized with a pressure fluid, for example hydraulic fluid, via the inlet 15, and the bellows 19 expands and the end body 35 is thus moved axially out of the position shown in FIG. 1, as a result of which the volume of the gas side 21 is reduced, the radially outer annular sections 53 form sliding surfaces of the guide bodies 55 with which the movable end body 35 of the bellows 19 is guided on the housing wall. In doing so, the inner annular sections 51 which are offset radially relative to the outer annular sections 53 form fluid passages on the outside of the bellows 19, as a result of which the gas side 21 continues on the outside of the bellows 19 as far as the retaining ring 25, with sealing taking place relative to the fluid side by the sealing arrangement 37 which is inserted between the retaining ring 25 and the housing closure part 13. As FIG. 1 shows, the annular groove 45 and thus the position of the guide body on the annular body 47 held in the annular groove 45 is offset axially beyond the adjacent bellows end 31 in the direction away from the housing-mounted bellows end 29. This position of the guide bodies 55 promotes the tilt resistance of the guidance of the bellows unit.

Figure 4:
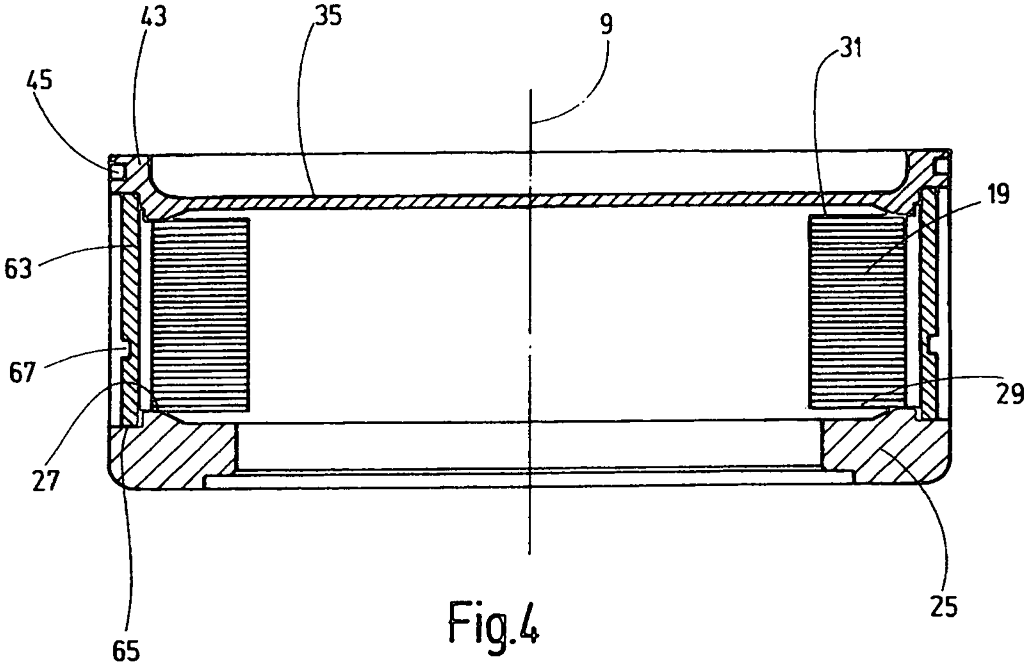
FIG. 4 shows a longitudinal section of only the bellows unit of the exemplary embodiment of the invention, which section is drawn enlarged compared to FIG. 1.

In a separate representation, FIG. 4 shows only the bellows unit with the bellows end 29 which is connected to the retaining ring 25 at the weld site 27. As is apparent, there is a circular cylindrical sleeve body 63 which extends axially along the outside of the bellows 19 and which is connected to the peripheral wall 43. The sleeve body extends over an axial length which is greater than the axial extension of the fully compressed bellows 19, with the arrangement being made such that the end of the sleeve part 63 which protrudes over the bellows end 29 in the state of the bellows 19 fully compressed in FIGS. 1 and 4 adjoins a stop shoulder 65 on the retaining ring 25 and thus forms a stroke limiter when the bellows 19 is compressed. As another particularity, in the sleeve part 63, there is a second annular groove 67 for a second annular body 47 so that the guiding device has a second group of guide bodies 55 which is offset relative to the group which sits in the annular groove 45 axially in the direction to the housing-mounted bellows end 29, specifically beyond half the length of the sleeve body 63 in the direction of the bellows end 29. This construction of the guiding device is characterized by an especially tilt-resistant guidance of the movable parts of the bellows unit.

When the hydraulic accumulator that is provided with the guiding device according to the invention is used as a pulsation damper, the fluid side 23 is in fluid connection with a pressure fluid, in particular a hydraulic fluid, a fuel, or lubricant, by way of the inlet 15, in order to stabilize any pressure surges. In this context, it has proven to be practical if, as disclosed in DE 10 2004 004 341 A1, the gas side 21 is filled not only with a working gas, but also with a specifiable volume fraction of a fluid. In this case, it has proved to be especially advantageous for the gas side 21 of the accumulator to have as the filling a combination of nitrogen gas as the working gas and ethylene alcohol as the fluid. In operation, the fluid can form a damping support medium between the folds and the deflections of the bellows 19; and this damping support medium can provide support as an abutment for the folded wall portions of the bellows 19 at the fluid, a feature that extends the service life of the bellows and, thus, enhances the operational reliability. The same applies, in particular, to rapid pulsations and fast pressure surges.

The invention claimed is:

1. A hydraulic accumulator, especially a pulsation damper, comprising a metal bellows (19) which on at least one bellows end (31) has an end body (35), said end body being movable along the wall of the housing (1) during the expansion and compression of the bellows (19), between the end body and the housing (1) there being a guide means (47) which on at least one peripheral region of the end body (35) on its outer periphery forms first annular sections (51) which have a radial distance from the wall of the housing (1) and which are separated from one another by second annular sections (53) which project radially beyond the first annular sections (51) and which are distributed on the outer periphery, the end body (35) being axially lengthened by a peripheral sleeve part (63) which extends in the direction to the immovable bellows end (29), and the end of the sleeve part (63) adjoining a housing-mounted retaining ring part (25) as a stop body when the bellows (19) is compressed, wherein the bellows (19) on the bellows end (29) opposite the movable end body (35) is fixed on the housing-mounted retaining ring (25) which the end of the sleeve part (63) strikes, and that the guide means (47) has an annular body which with one annular part (49) which forms the first annular sections (51) engages on the end body (35) a peripheral annular groove (45) which is located axially offset on the end body (35) away from the immovable bellows end (29) in the direction which increases the distance to the retaining ring (25).

2. The hydraulic accumulator according to claim 1, wherein the sleeve part (63) extends over a distance which exceeds the axial length of the compressed bellows (19).

3. The hydraulic accumulator according to claim 1, wherein in the sleeve part (63) there is a second annular groove (67) for the annular part (49) of another annular body (47) in the position which is axially offset toward the first annular groove (45).

4. The hydraulic accumulator according to claim 1, wherein the respective annular body (47) is formed from a plastic material with good sliding properties.

5. The hydraulic accumulator according to claim 1, wherein on the respective annular body (47) the second annular sections (53) are axially bordered by surfaces which are shoulderless continuations of the radial planes of the annular part (49) which is to be accommodated in the pertinent annular groove (45, 67).

* * * * *